(12) United States Patent
Feinberg et al.

(10) Patent No.: US 8,960,488 B2
(45) Date of Patent: Feb. 24, 2015

(54) FOOD TRAY DEVICE AND METHOD

(75) Inventors: Bruce G. Feinberg, Batavia, IL (US); Daryl Kellenberger, Glen Ellyn, IL (US)

(73) Assignee: Restaurant Technology, Inc., Oak Brook, IL (US)

(*) Notice: Subject to any disclaimer, the term of this patent is extended or adjusted under 35 U.S.C. 154(b) by 1348 days.

(21) Appl. No.: 12/315,019

(22) Filed: Nov. 25, 2008

(65) Prior Publication Data
US 2010/0129502 A1 May 27, 2010

(51) Int. Cl.
*A47J 45/00* (2006.01)
*A47J 39/02* (2006.01)

(52) U.S. Cl.
CPC .................................. *A47J 39/02* (2013.01)
USPC ........................................................ 220/756

(58) Field of Classification Search
CPC ......... A47J 37/01; A47J 45/077; A47J 37/06; A47J 36/022; B65D 1/34
USPC ........... 220/633, 676, 912, 630, 573.3, 573.4, 220/573.1, 737
See application file for complete search history.

(56) References Cited

U.S. PATENT DOCUMENTS

| | | | |
|---|---|---|---|
| 659,894 A * | 10/1900 | Osburn | 220/630 |
| 702,977 A * | 6/1902 | Madancy | 229/116 |
| 2,213,837 A * | 9/1940 | Gill | 220/575 |
| 2,997,199 A * | 8/1961 | Reachi | 220/23.86 |
| 3,079,037 A * | 2/1963 | Schechter | 220/212 |
| 3,107,028 A * | 10/1963 | De Robertis | 220/212 |
| 3,395,266 A * | 7/1968 | Price | 219/433 |
| 4,574,776 A * | 3/1986 | Hidle | 126/369 |
| 5,056,749 A * | 10/1991 | Ige | 248/346.11 |
| 5,347,979 A * | 9/1994 | Haber | 126/43 |
| 5,508,498 A * | 4/1996 | Rheinish et al. | 219/730 |
| 5,724,886 A | 3/1998 | Ewald et al. | |
| 5,947,012 A | 9/1999 | Ewald et al. | |
| 6,029,843 A * | 2/2000 | Kroscher et al. | 220/367.1 |
| 6,055,901 A * | 5/2000 | Gantos et al. | 99/412 |
| 6,119,587 A | 9/2000 | Ewald et al. | |
| 6,209,447 B1 | 4/2001 | Ewald et al. | |
| 6,358,548 B1 | 3/2002 | Ewald et al. | |
| 6,607,766 B2 | 8/2003 | Ewald et al. | |
| 6,721,996 B2 * | 4/2004 | Tippmann, Sr. | 16/425 |
| 7,021,202 B2 | 4/2006 | Sizer | |
| 7,163,120 B1 * | 1/2007 | Blucher | 220/573.4 |
| 7,288,745 B2 * | 10/2007 | Colonna | 219/439 |
| 2002/0000442 A1 * | 1/2002 | Howard et al. | 220/573.1 |
| 2002/0017516 A1 | 2/2002 | McKeen et al. | |
| 2006/0045943 A1 | 3/2006 | Calzada et al. | |
| 2007/0164035 A1 * | 7/2007 | Blucher | 220/573.4 |
| 2010/0129502 A1 * | 5/2010 | Feinberg et al. | 426/231 |

* cited by examiner

*Primary Examiner* — Steven A. Reynolds
*Assistant Examiner* — King M Chu
(74) *Attorney, Agent, or Firm* — Hinshaw & Culbertson LLP

(57) ABSTRACT

A food tray device for maintaining food warm or cold is disclosed. The food tray device has a support and a disposable tray portion or container. The container generally does not need to be sturdy enough to reliably carry food without the support. Optionally the support and container may have holes for limited venting of the tray interior while maintaining the moisture content of the food.

33 Claims, 8 Drawing Sheets

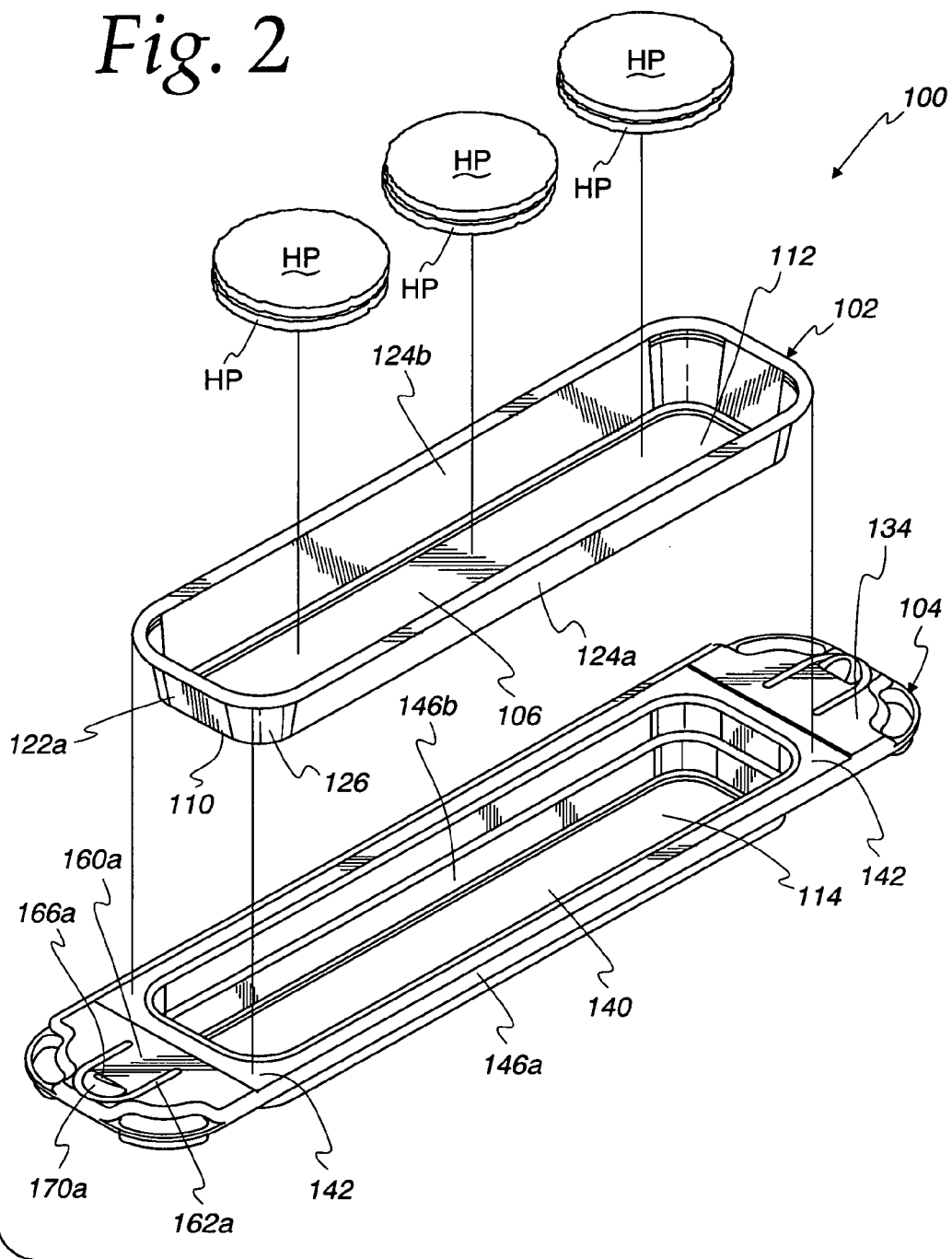

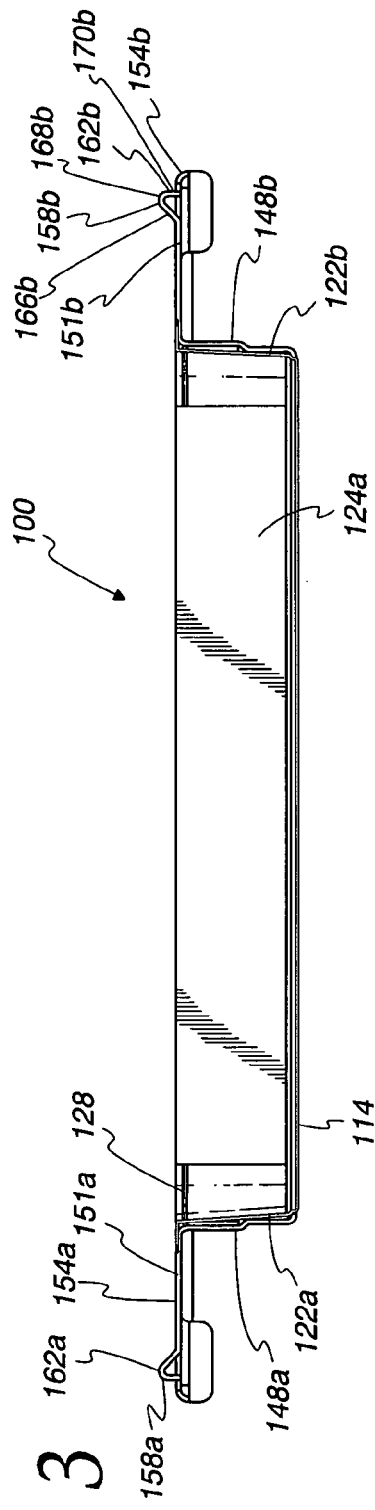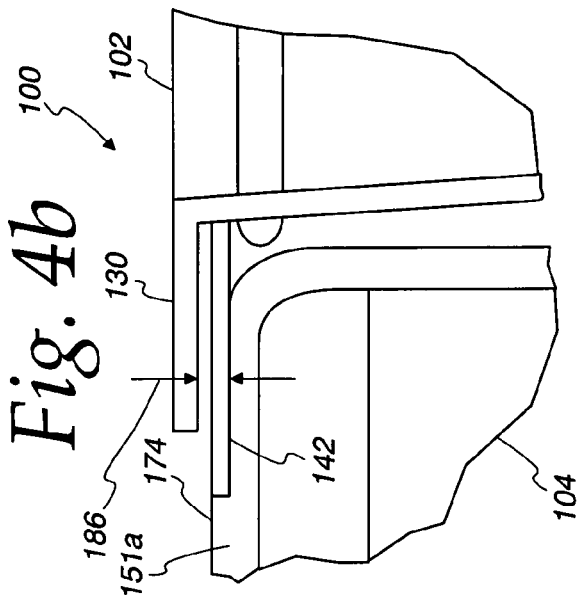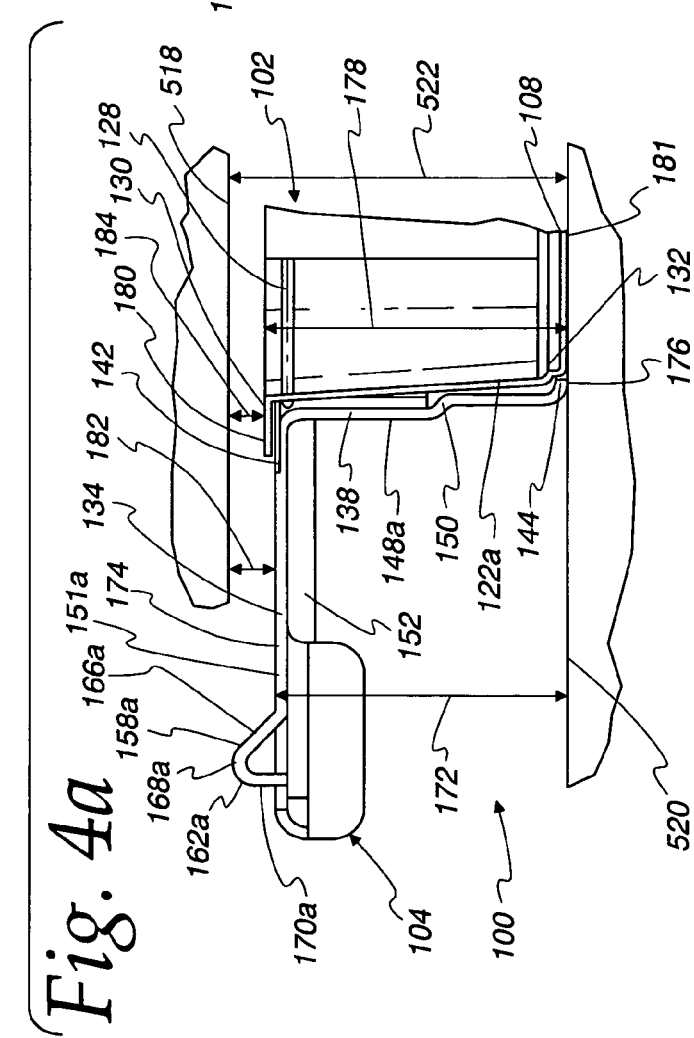

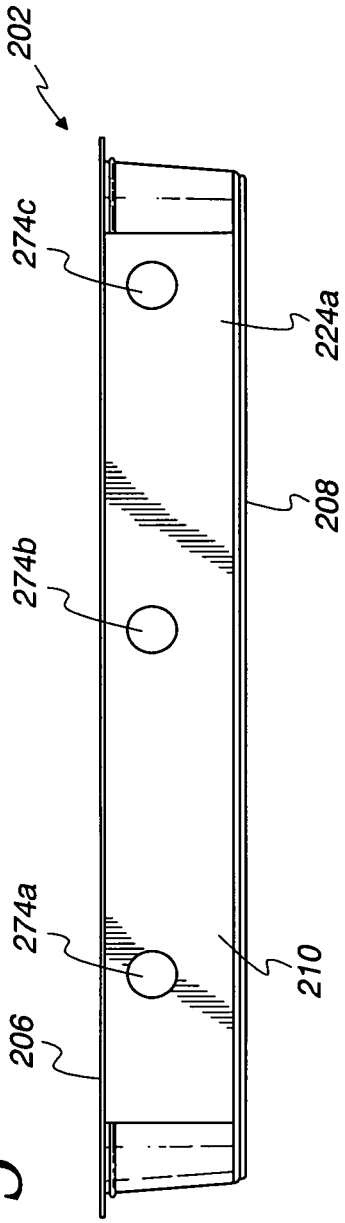
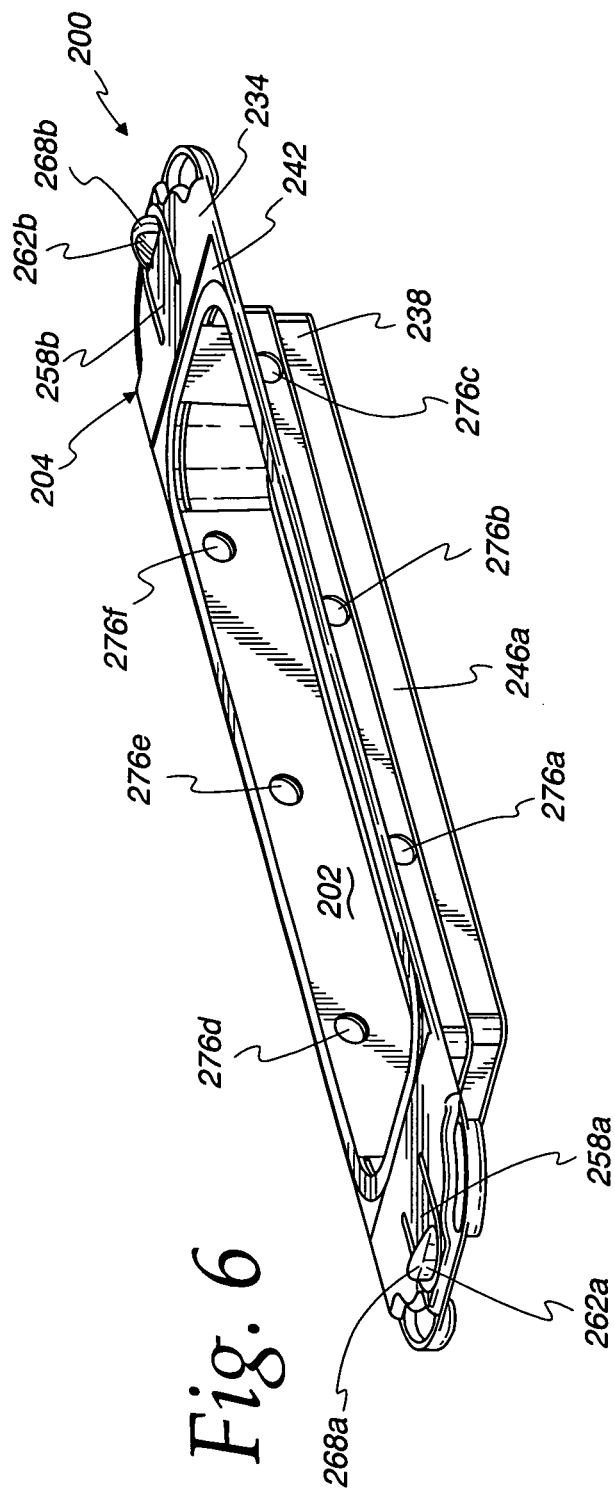

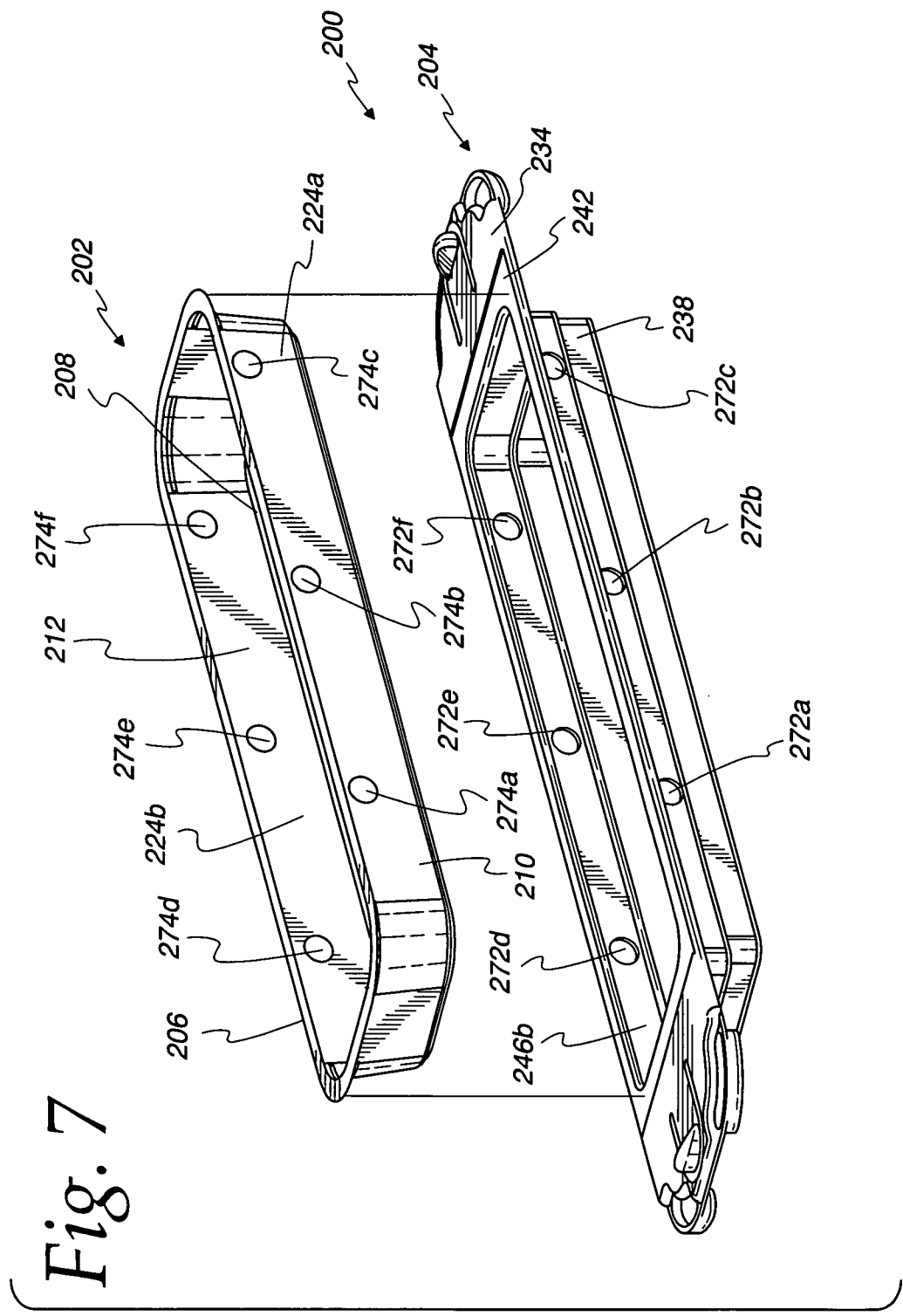

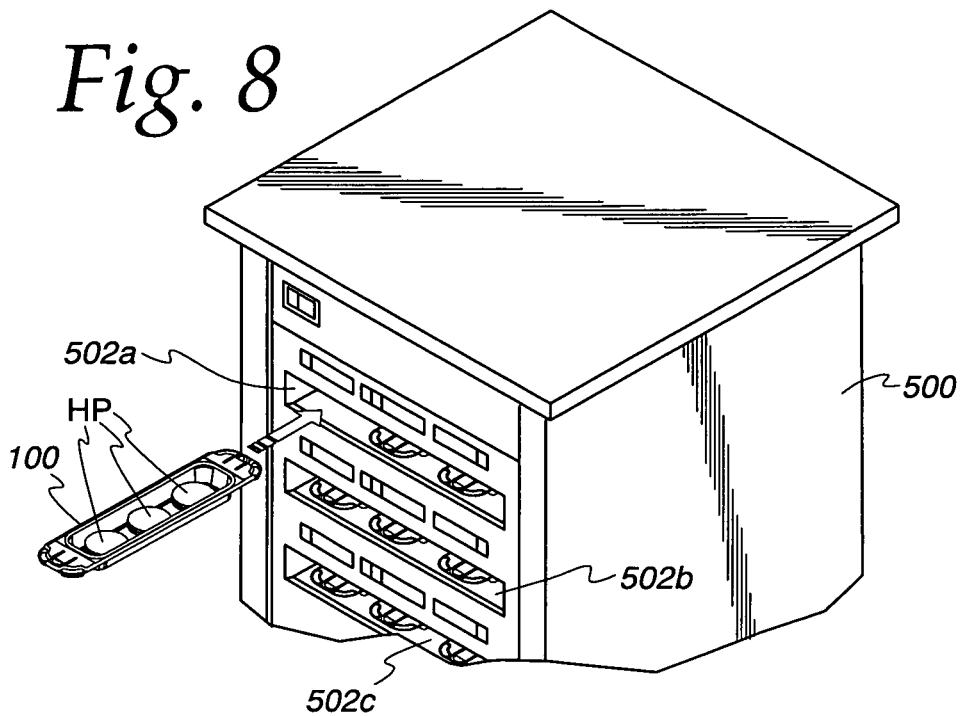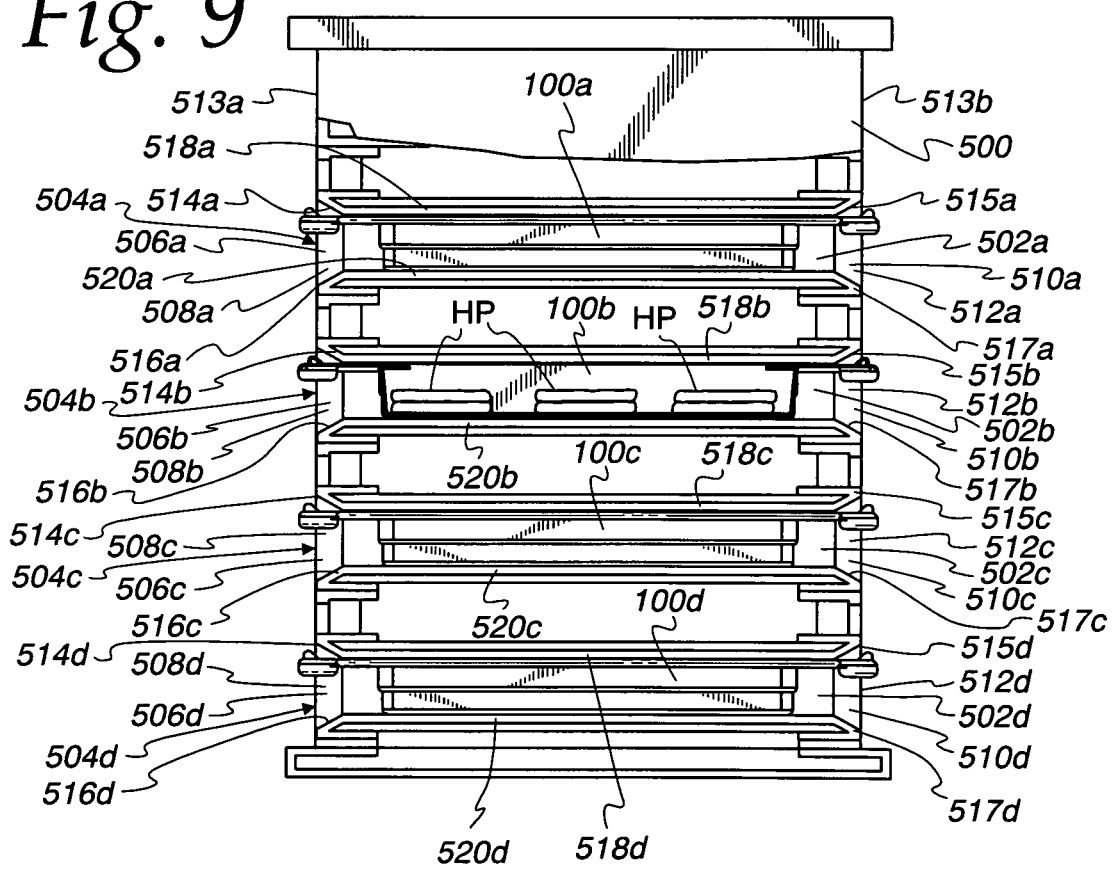

FOOD TRAY DEVICE AND METHOD

TECHNICAL FIELD

This invention relates to a food tray device and method that may be used to keep food heated or cooled. The food tray device and method of the present invention is particularly suited for use in heated compartments used in quick-service restaurants to store cooked food product, for example.

BACKGROUND OF THE INVENTION

Quick-service restaurants face a number of conflicting factors when striving to efficiently provide fast, good tasting, and safe food. First, customers expect to receive their food quickly, with a minimum of delay and with predictable and constant high quality. Moreover, the rate of customer demand varies over time, with some periods, such as lunch and dinner times, having extremely high rates of customer demand. However, the kitchens of many quick-service restaurants are of limited size and/or production capacity and thus necessarily have a limited number of food cooking devices.

To meet the often competing factors of quick service and consistent high quality, it is advantageous for a crew person to cook a relatively substantial amount of food product in bulk and store the cooked food product in food trays while another crew person transfers food from the trays to a sandwich bun or individual portion sized container, for example, to fill customer orders. Typical food products that are of most interest to have readily available for crew persons include sandwich fillings such as hamburger patties, breaded fish fillets, Canadian bacon, pork sausage, eggs, and breaded chicken patties, for example, as well as other products, such as chicken nuggets, biscuits, muffins, and hotcakes.

Because these prepared food products, e.g., sandwich fillings, are not being served immediately upon preparation, it is important to store the food product so as to optimally maintain the appearance, taste, temperature and texture of the food product, as well as minimize bacterial contamination of the stored food product.

A need exists for an improved food tray and a method of using the food tray that optimizes, without any significant adverse effects, the appearance, taste, temperature and texture of the pre-cooked bulk food products, as well as minimize bacterial contamination of such stored food products. In addition, a need also exists for a food staging device that promotes efficient food handling and use of space within the kitchen of the quick-service restaurant.

Additionally, prior art food trays were required to be periodically cleaned and dried, such as after about every four hours of use. In quick-service restaurants having extended opening hours during which food is served throughout the day, food trays may be cleaned as many as five or six times per day. During the time of cleaning, the trays are unavailable for holding cooked food. Thus, there is a need for a food tray that is more efficient.

SUMMARY OF THE INVENTION

In accordance with the present invention, a device which is an improved food tray and a method is provided, typically for use in connection with a food storage compartment, and preferably in a heated pass-through compartment, for holding ready-to-serve food products. When used in combination with a compartment of desirable configuration, the food tray device is particularly useful for storing over an extended period of time various types of food products including cooked sandwich fillings such as, for example, hamburger patties, fish fillets, Canadian bacon, pork sausage, eggs, chicken patties, chicken fillets as well as other types of food, including chicken nuggets, biscuits, muffins, and hotcakes. The appearance, taste, temperature and texture of the stored food items may be maintained over extended storage periods while also minimizing risk of bacterial contamination. In addition, the trays do not require extended cleaning and drying times.

In one aspect of the invention, a tray for holding cooked food portions at an elevated temperature is provided. The tray has a tray portion or container and a support. Typically, the tray portion substantially fits within the support, which substantially surrounds the sidewalls of the tray portion or container. The container has an open top, a bottom and a sidewall structure. The bottom and the sidewall structure of the container define an interior volume for containing the cooked food portions. The support has an open bottom. The container is removably disposed in the support and the container extends through the open bottom for allowing an external heated surface to contact the bottom of the container. The support is rigid compared to the container. Preferably, the container is supported by (1) an outwardly expanding top edge of the sidewall structure on the top of the support, and (2) an indentation in the sidewall structure. Typically, the container is a thin-walled plastic thereby requiring only a relatively small amount of material for construction and thus can be used as a disposable container. In this manner, washing or cleaning of the container is avoided during normal (disposable) use. Thus, the tray portion or container need not be capable of being able to carry or reliably carry food therein as a self-supporting structure without bending or otherwise collapsing or otherwise failing, in the absence of the support, such as if grasped at one end while filled or substantially filled with a food product without the support. Typically, the container is a thin-walled disposable container as described above.

In another aspect of the invention, an apparatus for holding previously cooked food portions at an elevated temperature is provided. The apparatus has at least one heated doorless compartment, a cabinet for housing the at least one compartment therein, and at least one tray placeable into the at least one compartment. The compartment has an upper compartment surface and a heated lower surface. The cabinet includes at least one cabinet opening for inserting and removing the previously cooked food portions into and out of said compartment. The tray has a container and a support. The container has an open top, a bottom and a sidewall structure. The bottom and the sidewall structure define an interior volume for containing the cooked food portions. The support has an open bottom and the container is removably disposed inside the support. The apparatus also has a means for supporting the tray in the compartment so that the bottom of the container is in contact with the heated lower surface and the top edge of the tray is spaced from the upper compartment surface.

In a third aspect of the invention, a method of storing a cooked food item is provided. The method includes providing a container having an open top, a bottom and a sidewall structure, the bottom and the sidewall structure defining an interior volume and providing a support having a support opening. Next, the container is placed into the support opening thereby forming a tray and the cooked food item is placed in the tray to at least partially fill the interior volume. Next, the tray having the cooked food therein is placed into a compartment having a heated surface so that the bottom of the container contacts the heated surface to maintain the temperature of the food in a desired elevated temperature range.

In a fourth aspect of the invention, a method of handling cooked food portions to be incorporated into a sandwich in a restaurant is provided. The method includes providing a container having an open top, a bottom and a sidewall structure, the bottom and the sidewall structure defining an interior volume and providing a support having a support opening. Next, the container is placed into the support opening thereby forming a tray and the cooked food item is placed in the tray to at least partially fill the interior volume. Next, the tray having the cooked food therein is placed into a compartment having a heated surface so that the bottom of the container contacts the heated surface to maintain the temperature of the food in a desired elevated temperature range. Then, the cooked food portion is removed from the tray and a sandwich is assembled using the cooked food portion from the tray.

BRIEF DESCRIPTION OF THE DRAWINGS

FIG. 2 is an exploded view of the first embodiment of the tray holding cooked food portions;

FIG. 3 is a side view of the first embodiment of the tray supported by the support;

FIG. 4a is an enlarged view of the first embodiment of the tray inside a cabinet; FIG. 4b is an enlarged view of a portion of FIG. 4a;

FIG. 5 is a side view of the container of a second embodiment of a tray;

FIG. 6 is a perspective view of the support of the second embodiment of the tray;

FIG. 7 is an exploded view of the second embodiment of the tray;

FIG. 8 is a perspective view of the first embodiment of the tray being inserted into a cabinet;

FIG. 9 is a broken away side view of the first embodiment of the tray inside a cabinet;

DETAILED DESCRIPTION OF THE INVENTION

Food Tray

Figure 1:
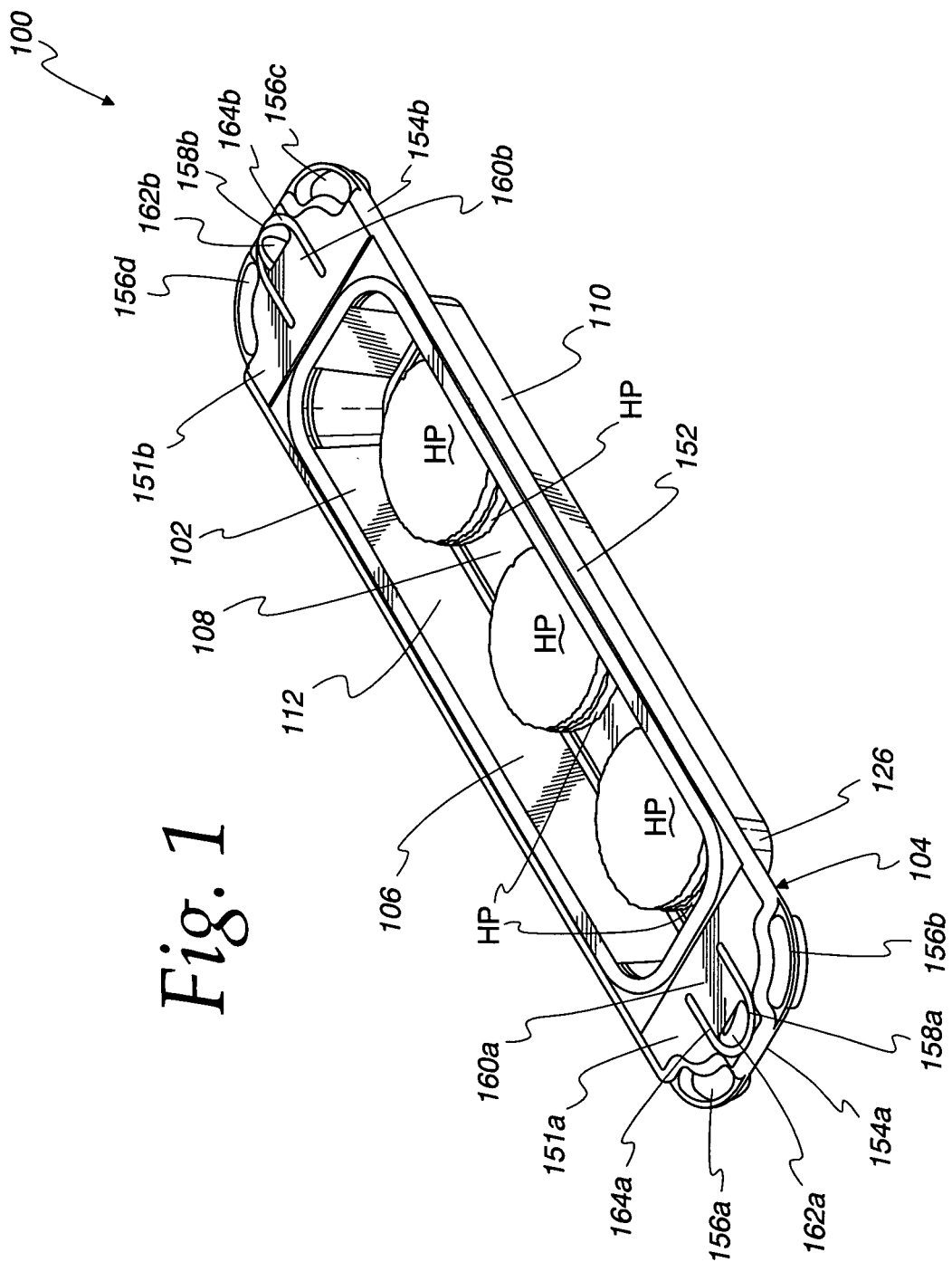
FIG. 1 is a perspective view of a first embodiment of a tray holding cooked food portions.

Referring to the Figures generally, two principal embodiments of the inventive tray are described herein. The first embodiment tray 100 is shown in FIGS. 1-4, and the second embodiment is shown in FIGS. 5-7. Tray 100 is composed of a disposable container or tray portion 102 and a support 104. Disposable container 102 has an open top 106, a bottom 108 and a sidewall structure 110. Bottom 108 and sidewall structure 110 are not perforated so that liquids or crumbs will not fall through. Bottom 108 and sidewall structure 110 define an interior volume 112 for containing cooked food portions stored therein, in this case being six (6) hamburger patties HP, stacked two high. Disposable container 102 is removably disposed in support 104. Disposable container 102 extends through an open bottom 114 of support 104 allowing bottom 108 to contact a heated surface which will be discussed in greater detail later.

Sidewall structure 110 of disposable container 102 has opposing end walls 122a and 122b and opposing sidewalls 124a and 124b. Sidewall structure 110 has rounded reinforced corners 126. Corners 126 have a reinforcing groove 128 or a plurality of grooves (not shown). Groove 128 does not extend throughout the length of sidewall structure 110 and is preferably substantially limited to the region of each corner 126. Groove 128 is preferably substantially parallel to bottom 108 so as to extend from an end wall 122 to a sidewall 124 by a direct path. Groove 128 may be at any height. Preferably, groove 128 is closer to a lip 130 than to bottom 108.

Lip 130 is one of several structures for supporting disposable container 102. Lip 130 is an outwardly expanding top edge of sidewall structure 110. Another supporting structure is indentation 132 in sidewall structure 110. As shown indentation 132 is at the junction of the sidewall structure 110 and bottom 108, but there could be a second or alternative indentation (not shown) located at a different height in sidewall structure 110. Preferably indentation 132 extends substantially along the length of sidewalls 124a and 124b. Preferably, indentation 132 extends substantially along the length of endwalls 122a and 122b. Most preferably, indentation 132 extends substantially along the entire length of sidewall structure 110. Corresponding structures in the support for supporting the container are discussed later.

Generally, the interior volume 112 is substantially rectangular or square in cross-section. Interior volume 112 is typically not perfectly rectangular or square due to the structures discussed above and because sidewall structure 110 preferably slopes inwardly from top to bottom to permit disposable containers 102 to nest inside each other, but can be as desired. Typically, the angle between sidewall structure 110 and bottom 108 omitting indentation 132 is between 105 and 90 degrees, more typically between about 100 and 91 degrees, and still more typically between about 98 and 93 degrees. Generally, sidewalls 124a and 124b are longer than endwalls 122a and 122b, preferably by a factor of 2 or more and more typically by a factor of 3 or more, but can be as desired.

Support 104 has a top 134, bottom 114 and sidewall structure 138. Top 134 has an opening 140 allowing disposable container 102 to be inserted into and removed from support 104. Top 134 has a recessed surface 142 for receiving lip 130. Bottom 114 is open. Bottom 114 is typically considered open if at least 90% of bottom 114 is open and/or so that bottom 108 can extend through bottom 114 to contact a heated surface. In addition to lip 130, disposable container 102 is supported by various support structures of support 104. One preferred support structure is a ledge 144, which engages indentation 132. An alternative or additional support structure is one or more joists (not pictured) running from sidewall 146a to sidewall 146b of sidewall structure 138 or from endwall 148a to endwall 148b of sidewall structure 138, for example and allowing disposable container 102 to extend between joists to contact a heated surface. A fourth support structure is sidewall structure ledge 150. A corresponding indentation in disposable container 102 is not illustrated. Ledges 144 and 150 may extend along the entirety or a portion of support sidewall structure 138. Preferably, ledges 144 or 150 extend substantially along the length of sidewalls 146a and 146b. Preferably, ledges 144 or 150 extend substantially along the length of endwalls 148a and 148b.

Support 104 is preferably reusable while disposable container 102 is preferably disposable. While disposable container 102 is self-supporting, it preferably does not support the weight of food when disposable container 102 is held at one end without buckling. In contrast, support 104 is intended to be reused many times and is capable of supporting disposable container 102 when filled with food products without the support deforming. Consequently, support 104 is rigid relative to disposable container 102. Bottom 108 and sidewall structure 110 of disposable container 102 are preferably thin walled and thus flexible and have a high coefficient of heat transfer, higher than that of support 104. One or both of disposable container 102 and support 104 are preferably integrally formed from plastic, but alternatively may be formed from any other suitable "food safe" material. Suitable materials include polystyrene, polycarbonate, polyethylene, polypropylene, stainless steel, aluminum or other materials as desired. For example, in one embodiment, support 104 is about 2 inches high, about 4⅝ inches wide across the top opening, about 3⅛ inches wide across the bottom opening, about 18 ⅝ inches long across the top opening and about 17⅛ inches long across the bottom opening and has a weight of about 10.4 ounces and is made of polycarbonate and has a thickness of about 0.0625 inches and disposable container 102 is about 2.2 inches high, about 4.5 inches wide across the top opening, about 3¾ inches across the bottom, about 18.5 inches long across the top opening, about 17-13/16 long at the bottom and a lip 130 width of 7/16 inches, has a weight of about 1.1 ounces and is made of polystyrene. Thus, disposable container or tray portion 102 can be fabricated from a very small amount of material and thus can be disposably and economically used in and can be a thin-walled container having a wall thickness, for example, of less than about 0.035 inches in one embodiment and can be a thin-walled container having a wall thickness of less than about 0.025 inches in another embodiment.

Support 104 has one and preferably two longitudinal extents 151a and 151b, which are each generally horizontally disposed on support 104 at the longitudinal ends thereof such that food tray 100 can be easily grasped by a crew person and maneuvered in and out of a compartment having substantially planar upper and bottom surfaces as will be discussed in further detail below. Additionally, support 104 typically includes a lip 152 which extends substantially around the entire periphery of support 104, including longitudinal extents 151a and 151b.

In addition, support 104 preferably has handle portions 154a and 154b at opposing ends adjacent longitudinal extents 151a and 151b. Each handle 154 preferably has one or more depressed peripheral areas 156a, 156b, 156c and 156d. Support 104 includes at least one movable stop member, and preferably includes two movable stop members 158a, 158b. Movable stop member 158a is located on longitudinal extent 151a and movable stop member 158b is located on longitudinal extent 151b.

As illustrated in FIGS. 1-4, each movable stop member 158a, 158b preferably includes a tongue 160a, 160b and an upturned portion 162a, 162b. Preferably, each movable stop member 158a, 158b is defined by a U-shaped void 164a, 164b. Upturned portions 162a, 162b include inclined portions 166a, 166b which face disposable container 102, radiused top edges 168a, 168b, and substantially vertical rear portions 170a, 170b. As such, moveable stop members 158a, 158b can easily be depressed from an extended position to a retracted position and thereafter return to an extended position when abutted against a fixed surface. Preferably, movable stop members 158a, 158b are integrally formed with support 104 from plastic or any other suitable "food safe" material. As shown in FIGS. 1-4, upturned portions 162a, 162b of stop members 158a, 158b extend vertically above longitudinal extents 151a and 151b of support 104. Alternatively, movable stop members 158a, 158b may include any other structure which enables movable stop members 158a, 158b to move from an extended position to a retracted position and return to the extended position. Reference is made to U.S. Pat. App. Pub. No. 2006/0045943, which is hereby incorporated by reference, for a more complete description of the general construction and operation of moveable stop members 158a, 158b. Additional desired features of tray 100 are discussed later especially as they relate to food staging device 500.

In a second embodiment, food tray 200 is provided as illustrated in FIGS. 5-7. Food tray 200 may be identical to food tray 100 except that food tray 200 is vented. For convenience, the reference numerals for food tray 100 are the same as the item numbers for food tray 200 for similar items except that the item numbers for food tray 100 begin with 1 while item numbers for food tray 200 begin with 2. Thus, food tray 200 has a container 202 with sidewall structure 210 and support 204 with support sidewall structure 238. In addition, support 204 has moveable stop members 258a, 258b with upturned portions 262a, 262b having a radiused top edge 268a, 268b.

Venting is provided by support openings 272a-f in support sidewall structure 238 and container openings 274a-f in container sidewall structure 210. Openings 272a-f and 274a-f in combination provide venting passageways 276a-f between container interior volume 212 and the exterior atmosphere. Typically, one to ten openings are located in both sidewall structures 210 and 238. As illustrated in FIGS. 5-7, three openings 272a-f and 274a-f are positioned in a spaced relationship along the length of each of sidewalls 224a, 224b and 246a, 246b. By spacing openings 272a-f and 274a-f along sidewalls 224a, 224b and 246a, 246b, various regions within interior volume 212 of container 202 are all relatively proximate to one of openings 272 and 274.

Each of support openings 272 at least partially overlaps with at least one of container openings 274 to form a passageway 276. Preferably, each of container openings 274 is substantially aligned with one of support openings 272. Additionally, preferably each of openings 272 is of approximately the same size, and the same number of openings 272 appears on each of sidewalls 246a, 246b. Similarly, preferably each of openings 274 is of approximately the same size, and the same number of openings 274 appears on each of container sidewalls 224a, 224b.

In a typical quick-service restaurant, cooked food items, such as hamburger or chicken patties HP, are placed in a tray and then stored in a food holding heated storage device until used to make sandwiches. Typically, an open top tray is desired to allow convenient removal of a hamburger patty to meet the speed demands of a quick-service restaurant. During storage, the cooked food tends to progressively lose desired moisture and taste properties as the atmosphere of the interior is vented out the open top of a prior art container. Known approaches to reduce the rate of the loss of juice and taste properties of the food product have included limiting the amount of venting, particularly from the open top of the tray. It has been unexpectedly found that a limited amount of venting through a tray's sidewall does not increase the rate of loss of desired food quality, but instead acts to maintain superior taste quality for food held in the tray for extended periods of time, such as about 60 minutes or more for cooked hamburger patties HP, for example, stored at 160° F.

An additional advantage of tray 200 with replaceable container 202 is that different containers 202 can have openings 274 that are optimal for different specific foods while support 204 does not change. This advantage is particularly useful if new foods with different optimal openings 274 are introduced in a restaurant. Container 202 may be marked with an indicia (not shown) indicating the food that is optimally stored in container 202.

Typically, openings 274 are circular in shape and have about the same diameter. Preferably, this diameter is in the range of about 5/16 inch to about 1¼ (5/4) inches, to provide a total cross-sectional opening area in the range of about 0.3 square inches to about 4.9 square inches for each opening 274. As an alternative, openings 274 may be of a non-circular shape, preferably the cross-sectional area of each of such openings is also in about the same range of about 0.3 square inches to about 4.9 square inches. Openings 274 are preferably also spaced upwardly from container bottom 208 so that any juices that may escape from food contained within tray 200 do not leak out of an opening 274. Openings 274 are also positioned downwardly from the top 206 to maintain structural integrity of container 202.

Openings 272 can be in any desired configuration, including as a slit opening extending along the length or a portion of the length of the sidewalls. Openings 272 can also match openings 274 by location. However, support openings 272 may be larger than container openings 274 for flexibility purposes so that support 204 is suitable for use with different containers 202 having different openings 274 for different foods as discussed earlier. As shown in FIGS. 5-7, support openings 272 are of the same size and shape as container openings 274.

More specifically, the desired food quality retention can be accomplished in accordance with the present invention by providing passageways 276 that have a total cross-sectional area (i.e. the sum of the total cross-sectional area of all passageways 276 at their narrowest point) that is selected in relationship to (i) the volume of interior space 212, (ii) the inner surface area of sidewall structure 210 and/or (iii) the weight of the food that is maintained in tray 200. Preferably, the ratio of the total cross-sectional area of passageways 276 in square inches to the size of interior volume 212 in cubic inches will be in the range of from about 1:2100 to about 1:13; more preferably the ratio is in the range of from about 1:140 to about 1:40; and most preferably the ratio is about 1:90. Preferably, the ratio of the total cross-sectional area of passageways 276 to the surface area of sidewall structure 210 is in the range of about 1:120 to 1:7, more preferably the ratio is in the range of about 1:80 to about 1:20; and most preferably the ratio is about 1:50. The surface area of sidewall structure 210 for the above ratio is the inner surface area of sidewall structure 210 rather than the outer surface. Preferably, the ratio of the total cross-sectional area of passageways 276 in square inches to the weight of the food held in tray 200 in pounds is in the range of about 1:30 to about 1:0.2, more preferably 1:1.85 to about 1:0.5, and most preferably about 1:1.35.

As illustrated in FIG. 6, the area of each container opening 274 is equal to the area of each support opening 272. As illustrated in FIG. 6, the total cross-sectional area of passageways 276a-f is six times the cross-sectional area of a single container opening 274 or a single support opening 272 or 6 times Tr times the radius of opening 274 or opening 272 squared ($6\pi r^2$). If container opening 274 is smaller than support opening 272 but everything else is the same as illustrated in FIG. 6, then the total cross-sectional area of passageways 276a-f is six times the cross-sectional area of a single container opening 274 or 6 times $\pi$ times the radius of opening 274 squared. If container openings 274 and support openings 272 only partially overlap then only the overlapping areas count towards the total cross sectional area of passageways 276a-f.

Figure 10:
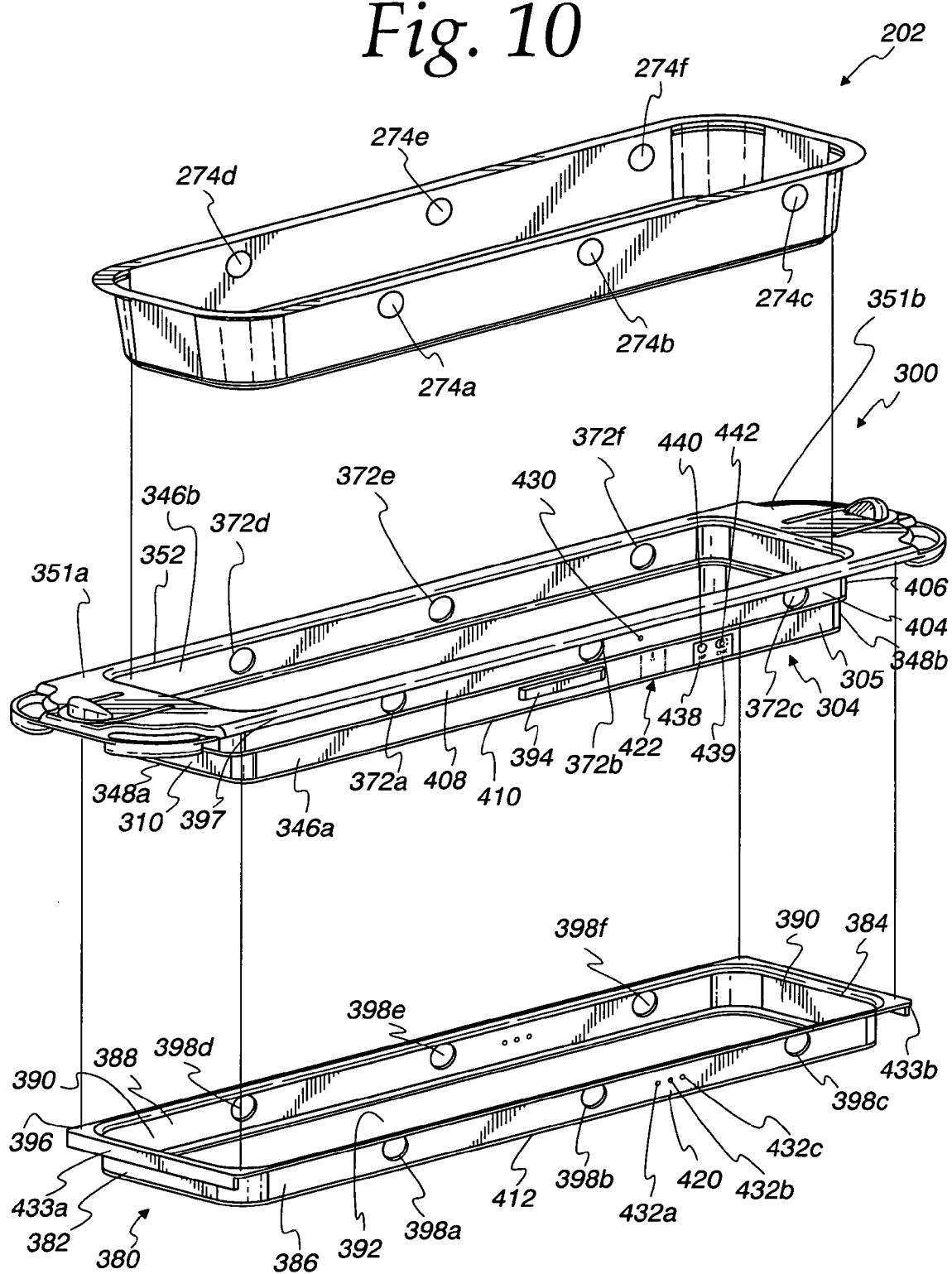
FIG. 10 is an exploded view of a third embodiment of the tray.
Figure 11:
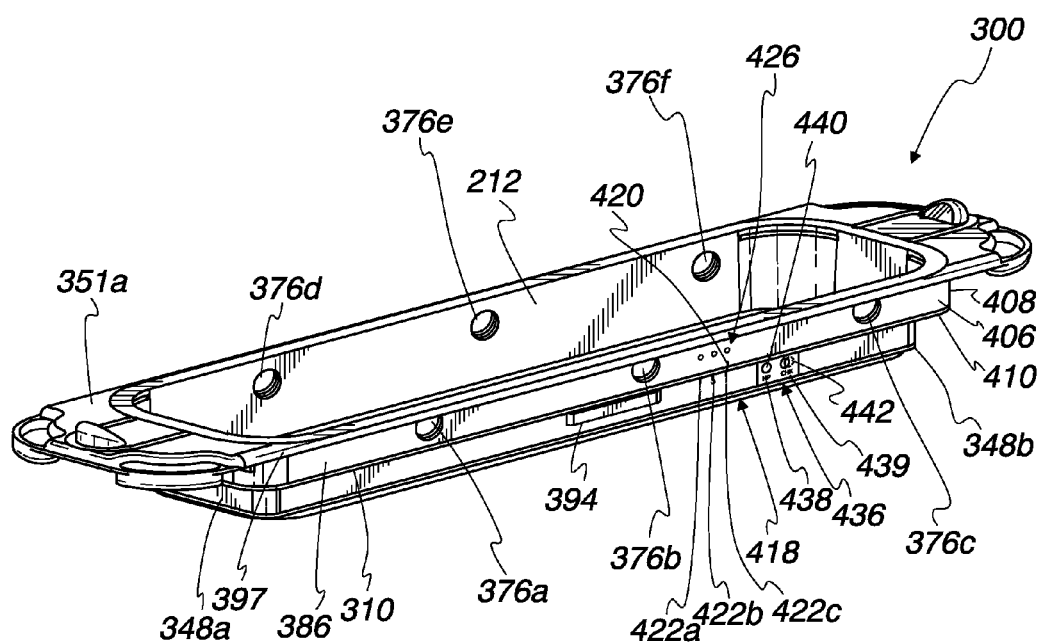
FIG. 11 is a perspective view of the third embodiment of the tray.

In a third embodiment, tray 300 has a support 304 and container 202 as shown in FIGS. 10-11. Tray 300 has adjustable passageways 376a-f as illustrated in FIG. 11. For convenience, the item numbers for support 204 are the same as the item numbers for support 304 for similar items except that the item numbers for support 204 begin with 2 while item numbers for support 304 begin with 3. Support 304 has a choke or slide member 380 mounted to support body 305 for reciprocal back-and-forth movement relative to support body 305, to thereby allow adjustment of the size of passageways 376. Slide member 380 may be formed of a unitary construction and may be molded of the same plastic or other food-safe material that is used to form tray 300. Alternatively, slide member 380 may be formed in two or more parts that are securely joined together.

Slide member 380 has a first end 382, a second end 384, a first side 386 and a second side 388 that together provide an inner perimeter surface 390 which defines a mounting opening 392. Mounting opening 392 is configured and sized to correspond to the upper portion of outer perimeter of sidewall structure 310 of support 304 along which slide member 380 is slideably mounted. Mounting opening 392 is made somewhat longer than the length of sidewall sides 346a, 346b to provide clearance space for longitudinal movement relative to support body 305.

To mount slide member 380 to support body 305, slide member sides 386, 388 are manually spread apart to temporarily provide clearance over slide supports 394. Slide supports 394 may be integrally formed with support sidewall sides 346a, 346b respectively, and outwardly protrude from sides 346a, 346b, respectively. Slide 380 is inserted over the sidewall structure 310, until the top surface 396 of slide 380 abuts against the bottom surfaces of extents 351a, 351b and with slide sides 386, 388 having cleared supports 394. Slide member sides 386 and 388 are then released from their spread-apart position to slideably secure slide member 380 on support 304. In addition to securing slide member 380, supports 394 act as guides along which slide member 380 can slide. Tray lip 352 may also include a downwardly extending flange 397 to direct slide member 380 into proper alignment during mounting, and to additionally guide slide member 380 as it is longitudinally slid relative to support body 305.

Slide member 380 has apertures 398a-f through slide member sides 386 and 388. As slide member 380 is moved back and forth through its stroke, the position of apertures 398a-f relative to sidewall structure openings 372a-f, respectively, is changed to thereby adjust the amount of venting of container interior volume 212 through sidewall openings 274a-f.

Preferably, slide member 380 provides a simultaneous and equivalent size adjustment of all venting passageways 376a-f. This can be accomplished by locating openings 372 and apertures 398 in an arrangement such that when slide member 380 is mounted to support body 305, openings 372 and apertures 398 are spaced a like distance apart. Stated another way, the locations for the center points of openings 372a-f and the center points of apertures 398a-f are chosen so as to provide for a substantially equal distance between the respective center points of openings 372a-f and apertures 398a-f when slide member 380 has been mounted to support body 305. This arrangement allows all of passageways 376a-f to be simultaneously fully closed, fully opened, or variably opened the same percentage amount as slide member 380 is longitudinally slid relative to support body 305.

Openings 372 and apertures 398 are preferably also arranged to provide convenient positioning of slide 380. Passageways 376 are formed by support openings 372, slide apertures 398, and container openings 274. Generally, support openings 372 and container openings 274 are of the same size and coincide. Preferably, passageways 376 are caused to be in the fully opened position when the stroke of slide member 380 is terminated in a first direction, and providing for a fully closed position for passageways 376 when the stroke of slide member 380 is terminated during movement in the opposite direction. Stated another way, when slide member 380 is moved to a position where slide member first end 382 abuts sidewall structure first end 348a to terminate further movement in that direction, openings 372a-f and apertures 398a-f are fully aligned and passageways 376a-f are fully opened. When slide member 380 is moved the full extent in the opposite direction to a point where second slide end 384 abuts tray sidewall structure second end 348b, openings 372a-f and apertures 398a-f are fully unaligned, i.e., slide member 380 is at the fully choked position, substantially closing off passageways 376a-f. Such arrangement allows a user to reliably and quickly move slide member 380 to fully opened or fully closed positions without closely inspecting the alignment of slide member apertures 398 relative to openings 372. Alternatively, the movement of the stroke of slide member 380 may be terminated by having slide member 380 contact other points on support 304.

Sidewall structure 310 has an upper portion 404 that has an outwardly projecting rim 406 having an outer surface 408 with a radiused bottom edge 410. Slide member 380 has an inwardly depending radiused flange 412 having an inner surface that slideably mates with radiused bottom edge 410 of rim 406. The mating of rim bottom edge 410 and flange 412 helps prevent foreign particles from entering between slide member 380 and rim 406. Such entrance of foreign particles is undesirable because it could interfere with the sliding motion of slide member 380, or allow foreign particles to find their way into interior volume 212 of container 202 via openings 274.

Support body 305 includes a passageway opening gauge 418 for use in setting the size of passageway openings 376 and to indicate the position of slide member 380 relative to openings 372. Gauge 418 includes a mark or line 420 on slide member 380, and a plurality of spaced apart calibrated marks or lines 422a-c on support body 305. When line 420 is vertically aligned with line 422b, slide member 380 has been moved to a predetermined partially opened condition for passageways 376, for example ½ open. When line 420 is vertically aligned with line 422a, slide member 380 has been positioned so that passageways 376 are fully closed. Vertical alignment of line 420 and line 422c indicates that slide member 380 has been positioned to the fully opened position for passageways 376.

Lines 420 and 422a-c may be integrally formed in slide member 380 and support body 305, respectively, such as in the form of a ridge or groove, or may be provided in other manners, such as lines printed onto the surfaces of support body 305 and slide member 380. Indicia may also be provided to indicate the extent passageways 376 are open or closed, such as indicia adjacent lines 422a-c with a notation of "closed," "½," and "opened," respectively. Additional calibrated lines 422 may also be provided, if desired, to indicate additional settings for passageways 376, i.e., ¼ opened, ¾ opened, etc.

In a further aspect of the invention, support 305 is provided with a mechanism 426 to secure slide member 380 at a selected position. Support body 305 is provided with an outwardly projecting detent or lug 430, while inner surface 390 of first side 386 of slide member 380 has three spaced apart indentations or recesses 432a-c. As slide member 380 is moved to a fully opened position for passageways 376, lug 430 moves into recess 432c. In this position, lug 430 cooperates with recess 432c to secure slide member 380 at the fully opened position. This engagement prevents slide member 380 from inadvertently being moved away from the selected fully opened position during the handling of tray 300. Pushing or pulling on handles 433a or 433b with a moderate force, however, causes lug 430 to disengage from recess 432c to allow slide member 380 to be selectively moved to the partially opened position, or to the fully closed position, as desired. In the partially opened position, slide member 380 is secured in position by cooperation of lug 430 engaging recess 432b. When slide member 380 has been moved to the fully closed position, slide member 380 is maintained in position by lug 430 engaging recess 432a. Support 304 may be provided with additional intermediate locking settings (not shown) for passageways 376 by providing additional recesses 432 positioned between recesses 432a and 432c.

A recommended setting guide 436 may also be provided to indicate recommended slide member positions based on the food type to be held in tray 300. Recommended setting guide 436 may be in the form of a sticker adhered to support body 305 or to slide member 380. Alternatively, recommended setting guide 436 may be molded integrally with support body 305 and/or slide member 380. Recommended setting guide 436 includes indicia indicating one or more food types, for example "HP" 438 for hamburger patty and "CHK" 439 for chicken breasts. Also included are visually readable graphical depictions 440 and 442 showing the recommended spacing of openings 372 relative to apertures 398 for a selected food type.

In an alternative embodiment not shown, rather than having a single slide member 380, support 304 has mounted thereto two separate slide members, one for sidewall 346a and one for sidewall 346b.

Food Staging Device

In another aspect of the invention, a food staging device 500 is provided. As shown in FIGS. 8-9, food staging device 500 has a plurality of heated compartments 502a-d for storing at least one, and preferably a plurality of food trays in accordance with the present invention. FIGS. 8 and 9 show food staging device 500 with food trays 100.

Each of compartments 502a-d is bounded by an upper compartment surface 518a-d and a lower compartment surface 520a-d. Preferably, upper surfaces 518a-d are heated. Preferably, lower surfaces 520a-d are heated. Upper heated compartment surfaces 518a-d and lower compartment surfaces 520a-d are preferably constructed from a material having a high thermal conductivity and preferably are constructed from anodized aluminum. Moreover, each of upper heated compartment surfaces 518a-d and lower heated compartment surfaces 520a-d are substantially flat and substantially horizontal to provide uniform heat transfer to any one of food trays 100a-d stored therein and to enable easy sliding of any one of trays 100a-d along the surface of lower heated compartment surfaces 520a-d. Steam is not used to directly heat food, such as hamburger patties HP, in trays 100.

Upper angled portions 514 and 515 in conjunction with stop members 158a, 158b cooperate to keep tray 100 within compartment 502. Unless the user applies a force on tray 100 in excess of a threshold force which would move one of stop members 158a, 158b downwards can tray 100 be removed from compartment 502.

As can best be seen in FIG. 4a, support 104 has a height 172 defined by the distance between top surface 174 of longitudinal extent 151a and a lower edge 176 of sidewall structure 138. Height 172 does not take into account the height of movable stop members 158a, 158b. Disposable container 102 has a height 178 defined by the distance between top surface 180 of lip 130 and a bottom surface 181 of bottom 108. For each food tray 100a-d, heights 172 and 178 are less than a height 522 of compartments 502a-d into which trays 100a-d are to be inserted. In other words, height 172 of support 104 and height 178 of container 102 are chosen so that there are predetermined distances 182 and 184, respectively, from upper compartment surfaces 518a-d when trays 100a-d are placed within any one of compartments 502a-d. One or both of predetermined distances 182 and 184 are preferably between about 0.00" and 0.09", more preferably between about 0.04" and 0.08", and most preferably about 0.06". Controlling one or both of predetermined distances 182 and 184 controls vapor transfer out of the volume 112 of trays 100a-d, thereby also controlling the fluid loss of the cooked food portions in trays 100a-d. Such control of fluid loss is critical for cooked food stored in trays 100a-d, such as egg products, hamburger patties, grilled chicken, pork sausage and Canadian bacon to maintain the appearance, texture, temperature, and taste thereof.

Generally, the height of disposable containers 102 is slightly higher than the working height of support 104, such as at recessed portion 142 and thus there is a typically relatively small gap distance 186. Gap 186 is the vertical distance that bottom of lip 130 is above recessed portion 142 immediately below lip 130 when tray 100 is supported by a level surface. Preferably, recessed surface 142 is the portion of longitudinal extent 151 immediately below lip 130. Gap distance 186 is typically greater than about 0 inches to about 0.2 inches, or more, if desired. This arrangement ensures that bottom 108 of disposable container 102 will be in contact with the surface on which tray 100 is placed, such as one of lower compartment surfaces 520a-d of food staging device 500. This helps to ensure good heat transfer through bottom 108 of disposable container 102.

Methods

The invention includes methods of storing cooked food items and methods of handling cooked food portions, such as to be incorporated in a sandwich in a restaurant. The methods include providing a container having an open top, a bottom and a sidewall structure, the bottom and the sidewall structure defining an interior volume and providing a support having a support opening. Next, the container is placed into the support opening thereby forming a tray and the cooked food items or portions are placed in the tray to at least partially fill the interior volume. Preferably, the interior volume is filled to at least half full. Next, the tray having the cooked food therein is placed into a compartment having a heated surface so that the bottom of the container contacts the heated surface to maintain the temperature of the food in a desired elevated temperature range. Generally, the compartment may be one of many compartments of a food holding device, such as food staging device 500.

Immediately before or after placing the tray in the compartment, a timer can be set for a predetermined time period as desired, which can be for more than 15 minutes, depending on the food. The predetermined time period can correspond to a length of time after which the food portions are not considered to have a high enough quality to serve.

After storage for a period of time, the cooked food item or portion is removed from the compartment. Generally, the cooked food item or portion is removed only after an order has been placed by a customer for a sandwich or meal incorporating the cooked food item. To remove the food item from the compartment, the tray is partially or completely removed from the compartment and the food item is removed from the tray. The period of time can be more than about 15, 30 or 45 minutes, for example. The period of time can be less than 4, 3, 2 or 1 hours, for example. A sandwich is assembled using the cooked food portion from the tray.

Once the tray has been emptied, the container may be reused if the container has been used for only a short period of time. Generally, the container will be removed from the support and a second, unused container will be placed into the support to form a new tray. The newly assembled tray can then be used for storing a cooked food item or handling cooked food portions to be incorporated in a sandwich as described above.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A tray for holding cooked food portions at an elevated temperature, comprising:
   an elongated disposable container having an open top, a bottom and an elongated sidewall structure, the bottom and the sidewall structure defining an interior volume for containing the cooked food portions; and
   a reusable support having an open bottom;
   wherein the container is removably disposed in the support, the support is rigid relative to the container, and the container extends through the open bottom for allowing an external heated surface to contact the bottom of the container, the container having insufficient buckle resistance along the elongated sidewall structure to prevent the container from buckling when held at one end without support when substantially filled with cooked hamburger patties, the reusable support capable of supporting the disposable container when filled with food products without deformation of the support.

2. The tray of claim 1 wherein the sidewall structure of the container has an outwardly extending top edge for supporting the container on the support.

3. The tray of claim 1 wherein the container is a thin-walled container having a wall thickness of less than about 0.035 inches 4. The tray of claim 3 wherein the container has a wall thickness of about 0.025 inches or less.

5. The tray of claim 2 wherein the top of the support has a recessed surface for receiving the outwardly extending top edge of the container.

6. The tray of claim 1 wherein the container has an indentation in its sidewall structure and the support has a corresponding support structure for supporting the container by the indentation.

7. The tray of claim 6 wherein the support is capable of at least partly supporting the container by the indentation.

8. The tray of claim 1 wherein the height of the container is greater than the working height of the support.

9. The tray of claim 1 wherein the sidewall structure comprises two opposed elongated sidewalls and two opposed end walls.

10. The tray of claim 1 further comprising at least one sidewall opening in the sidewall structure of the container for providing at least one air passageway therethrough for venting the interior volume of the tray.

11. The tray of claim 10 wherein the at least one passageway has a total cross-sectional area, the ratio of the total cross-sectional area of the at least one passageway in square inches to the interior volume of the container in cubic inches is in the range of from about 1:2100 to about 1:13.

12. The tray of claim 10 wherein the support further comprises a support sidewall structure having at least one support sidewall opening, the support sidewall opening being capable of alignment with at least one container sidewall opening to vent the interior volume of the tray through the support sidewall opening, wherein the container has a substantially rectangular horizontal cross-section.

13. The tray of claim 12 further comprising means for adjusting the size of at least one of the openings in the support sidewall.

14. The tray of claim 1 wherein the thickness of the bottom of the container is thinner than the average thickness of the support.

15. The tray of claim 1 wherein the bottom of the container has a higher heat transfer coefficient than the average heat transfer coefficient of the support.

16. The tray of claim 3 wherein the container is composed of material selected from the group consisting of polystyrene, polyethylene and polypropylene.

17. The tray of claim 1 wherein the bottom of the disposable container is substantially flat.

18. The tray of claim 17 wherein the container has a substantially rectangular horizontal cross-section.

19. The tray of claim 1 wherein the support further comprises first and second fixed handle portions at opposite ends of the support and the support may be gripped by either of the first and second handles without the container deforming when the container is substantially filled with cooked hamburger patties.

20. The tray of claim 6 wherein the support structure is a ledge which engages the indentation.

21. The tray of claim 6 wherein the support structure surrounds the container.

22. A tray for holding cooked food portions at an elevated temperature, comprising:
a disposable container having an open top, a bottom and a sidewall structure, the bottom and the sidewall structure defining an interior volume for containing the cooked food portions; and
a reusable support having an open bottom, an open top and an outwardly extending rim around the top of the support;
wherein the container is removably disposed in the support, the support is rigid relative to the container, the sidewall structure of the container has an outwardly extending top edge for supporting the container on the rim, and the container extends through the open bottom for allowing an external heated surface to contact the bottom of the container.

23. The tray of claim 22 wherein the rim has a recessed surface for receiving the outwardly extending top edge of the container.

24. The tray of claim 23 wherein the recess is substantially flat.

25. The tray of claim 22 wherein the rim comprises a handle.

26. The tray of claim 22 further comprising at least one sidewall opening in the sidewall structure of the container and the support further comprises a support sidewall structure having at least one support sidewall opening, the container sidewall opening being capable of at least partial overlap with at least one support sidewall opening to vent the interior volume of the tray through the support sidewall opening.

27. The tray of claim 26 further comprising means for adjusting the size of at least one of the openings in the support sidewall.

28. The tray of claim 22 wherein the container has an indentation in its sidewall structure engaging the support for supporting the container.

29. The tray of claim 28 wherein the support is capable of at least partly supporting the container by the indentation.

30. The tray of claim 22 wherein the container is made of material selected from the group consisting of polystyrene, polycarbonate, polyethylene and polypropylene and the material has a wall thickness of less than about 0.035 inches.

31. A tray for holding cooked food portions at an elevated temperature, comprising:
a disposable container having an open top, a bottom, and a sidewall structure, the bottom and the sidewall structure defining an interior volume for containing the cooked food portions, wherein the sidewall structure of the container comprises at least one sidewall opening for providing at least one air passageway therethrough for venting the interior volume of the tray;
a reusable support having an open bottom, an open top and an outwardly extending rim around the top of the support;
wherein the container is removably disposed in the support, the support is rigid relative to the container, the sidewall structure of the container has an outwardly extending top edge for supporting the container on the rim, and the container extends through the open bottom for allowing an external heated surface to contact the bottom of the container, and
wherein the support further comprises a support sidewall structure having at least one support sidewall opening, the container sidewall opening being capable of at least partial alignment with at least one support sidewall opening to vent the interior volume of the tray through the support sidewall opening.

32. The tray of claim 31 wherein the container has a substantially rectangular horizontal cross-section.

33. The tray of claim 31 further comprising means for adjusting the size of at least one of the openings in the support sidewall.

* * * * *

UNITED STATES PATENT AND TRADEMARK OFFICE
CERTIFICATE OF CORRECTION

Page 1 of 1

PATENT NO.         : 8,960,488 B2
APPLICATION NO.    : 12/315019
DATED              : February 24, 2015
INVENTOR(S)        : Bruce G. Feinberg and Daryl Kellenberger It is certified that error appears in the above-identified patent and that said Letters Patent is hereby corrected as shown below:

Col. 7, line 51, delete "times Tr times" and insert therefor --times $\pi$ times--.

Col. 10, after line 34, and before the paragraph beginning at line 35, insert the following paragraph:

--Each of compartments 502a-d is preferably heated and each of compartments 502a-d preferably includes a passageway 504a-d which extends from a first opening 506a-d on a first end 508a-d of each compartment 502a-d to a second opening 510a-d on the opposite second end 512a-d of each compartment 502a-d. Preferably, compartments 502 extend from one side 513a of food staging device 500 to the opposite side 513b. In one embodiment, each of the openings 506a-d and 510a-d of heated compartments 502a-d include a pair of upper and lower opposed angled portions 514a-d and 516a-d, and 515a-d and 517a-d, respectively to facilitate entry of any one of food trays 100. Reference is made to U.S. Pat. Nos. 6,119,587, 6,209,447 and 6,607,766 for a more complete description of the general construction and operation of food staging device 500.--.

Signed and Sealed this
Twenty-third Day of August, 2016

Michelle K. Lee
*Director of the United States Patent and Trademark Office*